United States Patent
Wendel et al.

(10) Patent No.: US 9,805,432 B2
(45) Date of Patent: Oct. 31, 2017

(54) DATA LOGGING SYSTEM AND METHOD

(71) Applicants: Dirk Wendel, Grasbrunn (DE); Stephan Herrmann, Markt Schwaben (DE); Michael Andreas Staudenmaier, Munich (DE)

(72) Inventors: Dirk Wendel, Grasbrunn (DE); Stephan Herrmann, Markt Schwaben (DE); Michael Andreas Staudenmaier, Munich (DE)

(73) Assignee: NXP USA, Inc., Austin, TX (US)

( * ) Notice: Subject to any disclaimer, the term of this patent is extended or adjusted under 35 U.S.C. 154(b) by 618 days.

(21) Appl. No.: 14/479,456

(22) Filed: Sep. 8, 2014

(65) Prior Publication Data

US 2016/0071228 A1    Mar. 10, 2016

(51) Int. Cl.
| | | |
|---|---|---|
| *G06T 1/00* | (2006.01) | |
| *G06K 9/00* | (2006.01) | |
| *G07C 5/08* | (2006.01) | |
| *G08B 13/196* | (2006.01) | |

(52) U.S. Cl.
CPC .......... *G06T 1/0007* (2013.01); *G07C 5/0891* (2013.01); *G08B 13/19676* (2013.01); *G06K 9/00926* (2013.01)

(58) Field of Classification Search
CPC . G06T 1/0007; G07C 5/0891; G06K 9/00926
See application file for complete search history.

(56) References Cited

U.S. PATENT DOCUMENTS

| | | |
|---|---|---|
| 5,523,799 A | 6/1996 | Hattori et al. |
| 6,795,642 B2 | 9/2004 | Matsumoto et al. |
| 7,397,496 B2 | 7/2008 | Arant |
| 8,305,463 B2 | 11/2012 | Umezaki et al. |
| 8,660,181 B2 * | 2/2014 | Streater ................ G11B 27/034 375/240 |
| 2003/0133614 A1 | 7/2003 | Robins et al. |
| 2005/0271251 A1 | 12/2005 | Russell et al. |

(Continued)

FOREIGN PATENT DOCUMENTS

EP          0947963 B1      6/2003

OTHER PUBLICATIONS

Van Der Vleuten, Rene J. et al, "New User Features for Digital Still Cameras Using Elastic Storage," ICCE, 2002 Digest of Technical Papers. International Conference on Consumer Electronics, 2002, p. 52-53; Jun. 18-20, 2002, Los Angeles, CA, USA; 0-7803-7300-6/02 2002 IEEE.

*Primary Examiner* — Huy T Nguyen

(57) ABSTRACT

A data logging system for logging input data received from a data source is described. The data logging system has a data storage memory. A data input is arranged to repeatedly receive input data having a temporal input data resolution. A write controller is arranged to write newly received input data as received via the data input into the data storage memory. The writing comprises writing the newly received input data at the temporal input data resolution. The writing comprises keeping recent data at the temporal input data resolution in the data storage memory, and overwriting part of old data with newly received input data while keeping another part of the old data in the data storage memory at lower data resolution.

20 Claims, 7 Drawing Sheets

(56) References Cited

U.S. PATENT DOCUMENTS

2010/0124402 A1* 5/2010 Minobe ............... G11B 27/034
    386/289
2012/0257071 A1* 10/2012 Prentice ............... H04N 5/2625
    348/220.1

* cited by examiner

| | | | | | | | |
|---|---|---|---|---|---|---|---|
| 0 | 4 | [ | 0 | 0 | 0 | 0 | 0 ] |
| 1 | 5 | [ | 0 | 0 | 0 | 1 | 0 ] |
| 2 | 6 | [ | 0 | 0 | 0 | 1 | 2 ] |
| 3 | 1 | [ | 3 | 0 | 0 | 1 | 2 ] |
| 4 | 5 | [ | 3 | 0 | 0 | 4 | 2 ] |
| 5 | 6 | [ | 3 | 0 | 0 | 4 | 5 ] |
| 6 | 1 | [ | 6 | 0 | 0 | 4 | 5 ] |
| 7 | 2 | [ | 6 | 7 | 0 | 4 | 5 ] |
| 8 | 6 | [ | 6 | 7 | 0 | 4 | 8 ] |
| 9 | 1 | [ | 9 | 7 | 0 | 4 | 8 ] |
| 10 | 2 | [ | 9 | 10 | 0 | 4 | 8 ] |
| 11 | 3 | [ | 9 | 10 | 11 | 4 | 8 ] |
| 12 | 1 | [ | 12 | 10 | 11 | 4 | 8 ] |
| 13 | 2 | [ | 12 | 13 | 11 | 4 | 8 ] |
| 14 | 3 | [ | 12 | 13 | 14 | 4 | 8 ] |
| 15 | 4 | [ | 12 | 13 | 14 | 15 | 8 ] |
| 16 | 2 | [ | 12 | 16 | 14 | 15 | 8 ] |
| 17 | 3 | [ | 12 | 16 | 17 | 15 | 8 ] |
| 18 | 4 | [ | 12 | 16 | 17 | 18 | 8 ] — T18 |
| 19 | 5 | [ | 12 | 16 | 17 | 18 | 19 ] — T19 |
| 20 | 3 | [ | 12 | 16 | 20 | 18 | 19 ] — T20 |
| 21 | 4 | [ | 12 | 16 | 20 | 21 | 19 ] |
| 22 | 5 | [ | 12 | 16 | 20 | 21 | 22 ] |
| 23 | 6 | [ | 12 | 16 | 20 | 21 | 22 | 23 ] |
| 24 | 4 | [ | 12 | 16 | 20 | 24 | 22 | 23 ] |
| 25 | 5 | [ | 12 | 16 | 20 | 24 | 25 | 23 ] |
| 26 | 6 | [ | 12 | 16 | 20 | 24 | 25 | 26 ] |
| 27 | 1 | [ | 27 | 16 | 20 | 24 | 25 | 26 ] |
| 28 | 5 | [ | 27 | 16 | 20 | 24 | 28 | 26 ] |
| 29 | 6 | [ | 27 | 16 | 20 | 24 | 28 | 29 ] |
| 30 | 1 | [ | 30 | 16 | 20 | 24 | 28 | 29 ] |

↑ ↑ ⎨⎯⎯⎯⎯⎯⎯⎯⎯⎬
F DTO        20

Fig. 3

DATA LOGGING SYSTEM AND METHOD

FIELD OF THE INVENTION

This invention relates to a data logging system, an image logging system, a black box system, a camera surveillance system, a surveillance area comprising such camera surveillance system, a vehicle comprising such black box system, a method of logging input data, a computer program product and a non-transitory tangible computer readable storage medium.

BACKGROUND OF THE INVENTION

Data logging systems are available for a variety of applications. For example, image data from a surveillance camera may be inspected real-time by, for example security personnel, but is generally additionally, or alternatively, also logged into an image logging system or an off-line archive. As another example, in a so-called black box application in a vehicle such as an air plane, a train, a bus, a truck, a car, or any other vehicle, data relating to the vehicle's position, the vehicle's operational conditions, the vehicle's technical condition, sound and/or video recording data from a vehicle's cabin, sound and/or video recording data from a vehicle's passenger compartment, sound and/or video recording data from communication with e.g. traffic control, environmental conditions, road conditions, and/or alike may be recorded and logged into a black box memory. Some types of black boxes may also be referred to as a flight recorder, which is an alternative name for an electronic recording device placed in an aircraft for the purpose of facilitating the investigation of aviation accidents and incidents. There are two common types of flight recorders: the Flight Data Recorder (FDR) and the Cockpit Voice Recorder (CVR). A Flight Data Recorder (FDR) (also ADR, for accident data recorder) is an electronic device employed to record any instructions sent to any electronic systems on an aircraft. It is a device used to record specific aircraft performance parameters. Another kind of flight recorder is the Cockpit Voice Recorder (CVR), which records conversation in the cockpit, radio communications between the cockpit crew and others (including conversation with air traffic control personnel), as well as ambient sounds. In some black boxes, both functions have been combined into a single unit.

As described in, for example, United States Patent Application US 2005/0271251 A1, many surveillance systems record and store surveillance footage to video tape or other medium for future reference and analysis. With the advent of digital storage, it is possible to store video footage to a wide variety of digital storage devices, such as computer hard drives, optical disks and electronic non-volatile storage medium such as flash memory. In those systems that record video footage, all footage produced by a surveillance camera is typically stored in its entirety. The digital files generated by a video camera are very large and require a great deal of storage space. In addition, in order for a surveillance system to fully monitor an area, multiple cameras are generally required. There is a trend that the number of cameras in a surveillance system increases while the amount of video data that is to be stored also increases. In order to accommodate these storage requirements, many current surveillance system architectures make use of video archives that roll over after a certain timeframe. For example, a system may include a set of video tapes or computer disks that can store two months' worth of continuous surveillance data. For two months, surveillance data is sequentially written to the set of tapes or disks until the set is full. At this point, the set of tapes or disks is re-used, starting with the first tape or disk that contains the oldest data. Any new video surveillance data is then stored on the first tape or disk in the set, overwriting the old surveillance data. Obviously, older surveillance video data, which may still have value, is lost in a system that performs rollover storage. Alternatively, some systems back up or archive all video data wholesale to archival media once the data has become "stale." That is, all data captured by the surveillance system is archived after a set period of time passes after the data is captured. In these systems, once data has been archived, it is no longer readily available to a user of the system. The archival media must be identified and loaded in order to view or obtain information about a particular event caught by surveillance video. Typically in these systems, all data is archived, and any data that is archived remains on the archival media permanently.

United States Patent Application US 2005/0271251 A1 describes methods of managing video data storage in a video surveillance system to extend the amount of calendar time for which video and image data can be stored on a storage device. The disclosed methods apply decision criteria, such as rules, configuration data and preferences, to support intelligent automatic reduction of stored surveillance data such that images and video data of most interest are maintained while less important data is deleted, compressed or archived. According to US 2005/0271251 A1, the method described therein can be applied to all data stored in a surveillance system such as, for example, video data, audio data, images, or metadata. This intelligent data reduction frees up space on surveillance video storage devices-effectively substantially extending the amount of calendar time that can be stored on a storage device of a given size compared to other current systems. According to US 2005/0271251 A1, the techniques described therein provide for managing video data storage in a video surveillance system by obtaining data storage management rules from a user and applying the rules to the stored video data. The data storage management rules include data storage rules and data importance assessment rules. The video data generated by the video surveillance system is stored in accordance with the data storage rules, and video data storage is automatically updated in accordance with the data storage rules and the data importance assessment rules.

However, prior art methods like the methods described in US 2005/0271251 A1 rely on data storage management rules include data storage rules and data importance assessment rules obtained from a user, and techniques like significant event determination, assessing the value of detected events, types of events, object recognition process, and other techniques to support intelligent automatic reduction. Such intelligent techniques may however result in an incorrect assessment of data importance, in which case possibly important data may not be logged even though a vast amount of non-relevant data may be present. Further, for certain type of data in some applications, it may be difficult for a user to define data storage rules and data importance assessment rules, or not wishful. For example, in some black box application, it may not be acceptable by the relevant authority that data logging decisions are made by applying data storage rules and data importance assessment rules obtained from a user that may not be robust against non-foreseeable situations, such as accidents of unknown types. It may for example be difficult to define data storage rules and data importance assessment rules supporting uncompromised storage of data prior to an event that may occur at an unexpected moment in the future.

SUMMARY OF THE INVENTION

The present invention provides a data logging system, an image logging system, a black box system, a camera surveillance system, a surveillance area comprising such camera surveillance system, a vehicle comprising such black box system, a method of logging input data, a computer program product and a non-transitory tangible computer readable storage medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

FIG. 3 schematically illustrates input data storage in a data storage memory;

DETAILED DESCRIPTION OF THE PREFERRED EMBODIMENTS

Non-limiting examples of embodiments will be described below with reference to an exemplary surveillance system and with reference to an exemplary black box system, but disclosure is not limited to any of these specific systems.

Figure 1:
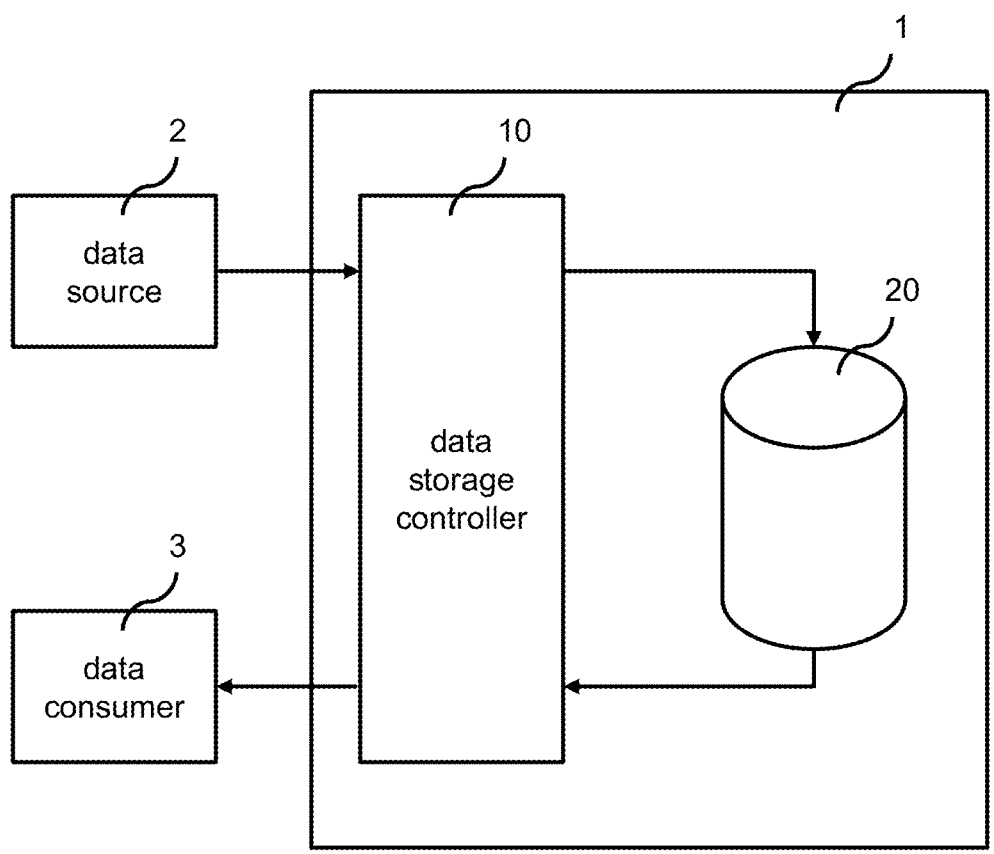
FIG. 1 schematically shows an example of an embodiment of a data logging system connected to a data source and a data consumer.

FIG. 1 schematically shows an example of an embodiment of a data logging system 1 connected to a data source 2 and a data consumer 3. The data source 2 can be any type of data source, such as a camera or a plurality of devices including a camera providing image data at a temporal resolution, such as at a frame rate of 24 Hz. In a surveillance system, the camera 2 may be a surveillance camera in an establishment such as a home, an office building, a factory, a warehouse, an industrial site, any other type of building, or one or more surveillance cameras for one or more surveillance areas. In a black box system in a vehicle, the camera may be on on-board camera arranged to record images from an outside environment of the vehicle, such as an on-board camera of a car with a forward viewing angle or a rearward viewing angle, an on-board camera of an airplane with a downward viewing angle to image e.g. the runaway during take-off and landing, and/or an on-board camera arranged to record images from the vehicle's interior, such as an airplane's cockpit, cabin or passenger compartment. The data source 2 can be a different type of data source than a camera or comprise data sources different than a camera next to one or more cameras. The data source 2 can comprise a video source arranged to provide video data. The video data may be in a JPEG format, in a H.264 format, or in another suitable video format. The data source 2 may e.g. comprise a voice recorder providing voice data; a performance monitor for providing performance data indicating, for example, a data quality; a performance data associated with a vehicle's performance, such as speed, acceleration, operational conditions, data obtained from monitored devices and security related information such as acceleration sensor information and alike, an environmental information monitor for providing environmental data such as inside temperature, outside temperature, weather conditions, and a geographic position detector for providing geographical data such as a vehicle's position. The data source 2 may be arranged to provide input data to the data logging system 1 at a temporal input data resolution. The temporal input resolution may depend on the type of data. For example, the temporal input resolution may correspond to the frame rate for video images captured by a camera, a rate of, e.g., 1 Hz or lower for temperature information, a rate of 100 Hz or more for acceleration data, and alike. Herein, the term temporal resolution refers to number of occurrences per temporal unit of time. Temporal resolution may also be referred to as time resolution. For video data, the temporal resolution of the successive frames of the video data is usually given as frames per second expressed in Hertz. The term a second temporal resolution is lower than a first temporal resolution refers to a lower number of occurrences per temporal unit of time for data at the second temporal resolution than the number of occurrences per temporal unit of time for data at the first temporal resolution. For video data, a lower temporal resolution corresponds to a lower frame rate.

The data logging system 1 comprises a data storage memory 20 and a data storage controller 10. The data storage memory 20 is arranged to store a plurality of data at a plurality of data storage locations. The data storage memory can be, for example and without limitation, any one or more of the following: magnetic storage media including disk and tape storage media; rewritable or re-recordable optical storage media such rewritable compact disk media such as CD-RW, digital video disk storage media such as DVD-RW and BluRay disk media; nonvolatile memory storage media including semiconductor-based memory units such as FLASH memory; ferromagnetic digital memories; MRAM; or any other suitable memory allowing writing, overwriting and retrieving data therein. The data storage memory may have a pre-determined capacity available for storing data of the data logging system. For example, the plurality of data storage locations may be associated with the pre-determined storage capacity. The data storage controller 10 is connected to the data storage memory 20 to write data into the data storage memory and to retrieve data from the data storage memory 20. In an alternative embodiment, the data storage controller 10 may only be arranged to write data into the data storage memory, and another device or unit may be available for retrieving data from the data storage memory 20. The data storage controller 10 is connected to the data source 2 to receive input data to be written into the data storage memory 20. In FIG. 1, the data storage controller 10 is connected to the data consumer 3 to provide input data previously written into the data storage memory 20 to the data consumer 3. The data consumer 3 may e.g. be a computer system arranged to provide data from the data logging system to a user, such as security officers in a security surveillance room supervising one or more surveillance areas. It will be understood that the data storage controller 10 may be unconnected from the data consumer 3 during data logging, and that a data consumer 3 may be connected when considered appropriate, such as when a user wants to inspect the data.

Figure 2:
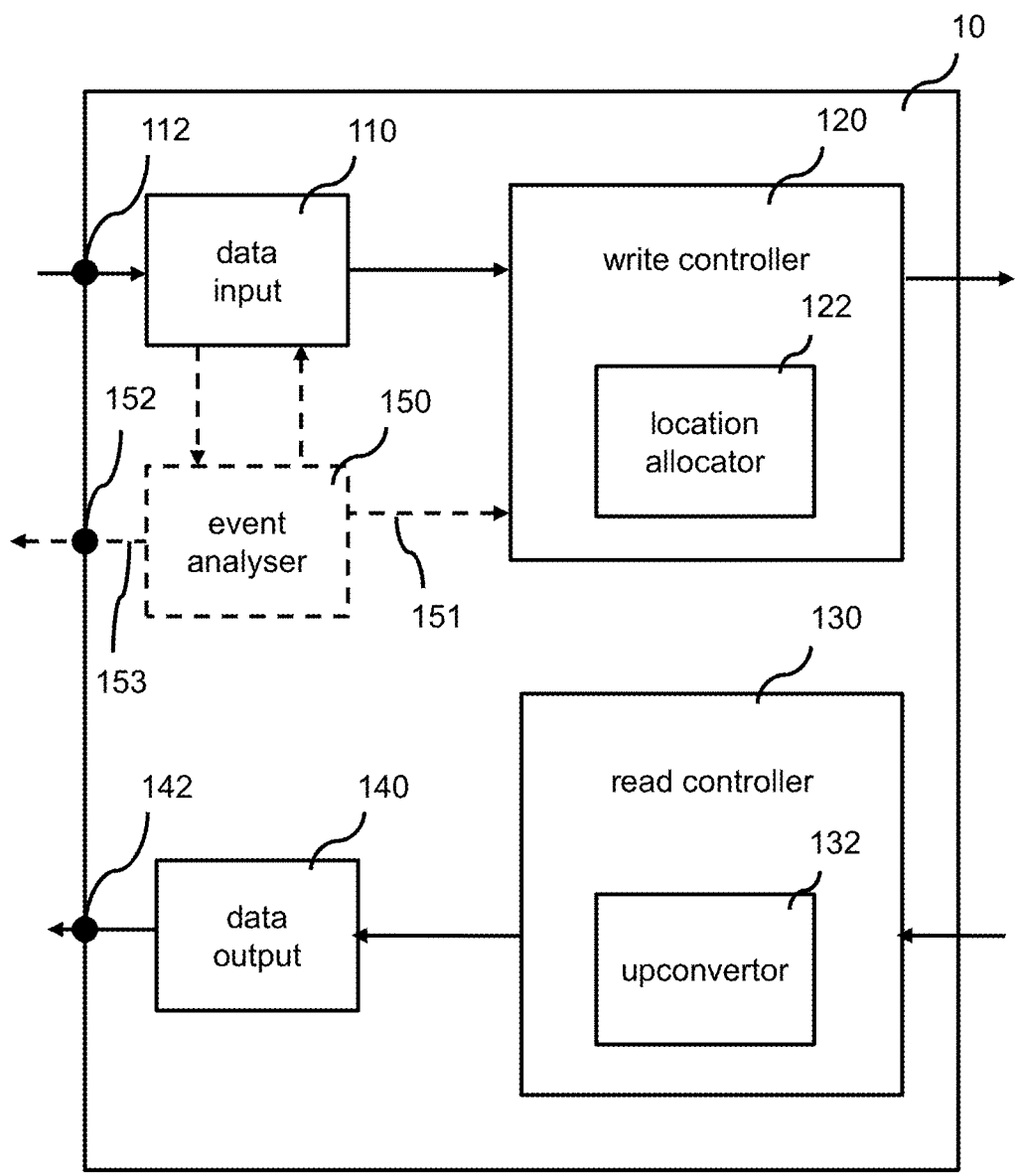
FIG. 2 schematically shows a detailed example of an embodiment of a data storage controller of a data logging system.

FIG. 2 schematically shows a detailed example of an embodiment of a data storage controller 10 of the data logging system 1 shown in FIG. 1. In the embodiment shown in FIG. 2, the data storage controller 10 comprises a data input 110 connectable to the data source 2 via an input terminal 112 and a data output 140 connectable to the date consumer 3 via an output terminal 142. The data input 110 is arranged to repeatedly input data having a temporal input data resolution from the data source 2. Input data that is received and is now being processed may in the following be referred to as newly received input data, or simply as new input data. Input data that has been received at an earlier moment than the new input data may be referred to as earlier input data. Thus, the data input 110 repeatedly receives new input data after having received earlier input data. The data storage controller 10 comprises a write controller 120. The write controller 120 is arranged to write the new input data received via the data input into the data storage memory 20. The first temporal aged data resolution is lower than the temporal input data resolution. The writing comprises writing the newly received input data at the temporal input data resolution. The writing comprises, if the data storage memory comprises recent data, keep the recent data at the temporal input data resolution in the data storage memory. The writing comprises, if the data storage memory comprises old data, overwrite part of the old data with at least part of the newly received input data while keeping another part of the old data in the data storage memory at a first temporal aged data resolution. The recent data corresponds to input data previously written into the data storage memory and satisfying a pre-determined recent age criterion. The old data corresponds to input data previously written into the data storage memory and satisfying a first pre-determined age criterion. The first temporal aged data resolution is lower than the temporal input data resolution. The first pre-determined age criterion is associated with input data having a higher age than input data satisfying the pre-determined recent age criterion. The first pre-determined age criterion may correspond to the complement of the pre-determined recent age criterion, whereby input data not satisfying the first pre-determined age criterion satisfies the pre-determined recent age criterion. In an embodiment, the pre-determined recent age criterion corresponds to input data previously written having an age not higher than a first predefined age limit, which may be further referred to as the recent age limit, and the first pre-determined age criterion corresponds to input data previously written having an age higher than the first pre-determined age limit.

The first pre-determined age criterion may e.g. correspond to earlier input data having been written into the data storage memory 20 more than a certain time period in the past. The first pre-determined age criterion may be associated with a pre-determined time period, or to a pre-determined number of storage locations used for storing the input data in the data storage memory 20. As a result, recent data is written in the data storage memory at the temporal input data resolution, whereby the data may be stored in its full resolution, whereas old data is kept in the data storage memory at a reduced resolution. The recent data may thus be available from the memory in its full temporal resolution, whereas the old data is available at a reduced temporal resolution. The old data available at reduced resolution may also be referred to as corresponding to subsampled set of the data as originally written into the data storage memory. Thus, no intelligent decision as to which new input data is to be written is performed and the risk associated with the prior art of making a wrong decision such that relevant data may not be stored at full resolution is lifted. With recent data being available at full temporal resolution and old data being available at a reduced temporal resolution, traffic inspection authorities may e.g. be able to, after an accident, recover all input data from the data logging system at full temporal resolution where the data relates to the period just before the accident and where a minor temporal glitch in part of the data may be indicative as to the reason of the accident, while also being able to recover old data, for which the lower temporal resolution (the first temporal aged data resolution) allows to reconstruct also what happened much earlier before the accident, at a sufficiently adequate level.

In an embodiment, overwriting part of the old data with newly received input data while keeping the another part of the old data in the data storage memory at the first temporal aged data resolution may comprise overwriting part of the old data that is of one or more pre-determined types. For example, where the input data is video data comprising I- and P-type frames as in e.g., H.264, the pre-determined type may be the P-type frames. Where the video data further comprises B-type frames, the one or more pre-determined types may be the B-type frames, or B-type frames and P-type frames. In such embodiment, I-type frames may be kept at the first temporal aged data resolution whereas B-type and P-type frames are overwritten, when overwriting part of the earlier input data while keeping earlier input data satisfying the first pre-determined age criterion in the data storage memory at the first temporal aged data resolution.

In an embodiment, the first temporal age data resolution may vary over time and/or in dependence on the input data comprising varying types or with varying formatting of input data. For example, in some examples of H.264, frames may be formatted as so-called I-frames and so-called P- and B-frames, and some H.264 formats comprise I-frames which may be at a varying temporal distance, with a variation within a certain range. The first pre-determined age criterion may in such case also impose a frame-type dependency requirement, such that P- and B-frames can be overwritten when older than one age limit, whereas I-frames can only be overwritten when older than an older age limit. Hereby I-frames may be are kept at a preference above P- and B-frames, and the first age data resolution may vary within a range associated with the variation in temporal distance between I-frame in the input data a provided by the data source.

As shown in FIG. 2, the write controller 120 may comprise a location allocator 122. The location allocator 122 may be arranged to determine which data storage locations comprise old data. The location allocator 122 may be arranged to determine which of the data storage locations comprising old data are available to be overwritten with newly received input data. The location allocator 122 may hereby be arranged to determine which of the data storage locations comprising old data are available to be overwritten with newly received input data, so as to keep the old data at the first temporal aged data resolution in the data storage memory 20.

The write controller 120 may be arranged to write into the data storage memory 20 using a file system for writing the newly received input data to the data storage memory, to hereby hide the complexity of the physical allocation in the data storage memory from the write controller, and to allow the write controller to access the data storage locations from a higher, logical level. The file system may be provided by an operating system of a programmable device if the write controller is implemented in a programmable device. The write controller may e.g., when the input data is image data received at an image frame rate, use sequential numbering of the images to determine which data storage locations comprising earlier input data satisfy the first pre-determined age criterion is satisfied, and where the new input data may be written by overwriting earlier written data to keep the earlier input data satisfying the first pre-determined age criterion in the data storage memory at the first temporal aged data resolution.

The first temporal aged data resolution may be at least a factor of 2 lower than the temporal input data resolution. The first temporal aged data resolution may be at least a factor of 4 lower than the temporal input data resolution. In a first example, the first temporal aged data resolution is a factor of 4 lower than the temporal input data resolution. In this first example, one quarter of the old data is kept, while three quarters of the old data can be overwritten with new input data. Hereby, the temporal range that can be logged may be increased by for example a factor of about two and a half, by using half of the total memory capacity for the new input data at the temporal input data resolution and the other half of the total memory capacity for old input data at a four times lower temporal resolution, instead of using the whole memory capacity for new input data at the first temporal aged data resolution (where each input data has a similar size). For example, if the data storage memory is able to store 100 pictures, 50 pictures may be stored at full temporal resolution and 50 pictures may be stored at quarter temporal resolution, to effectively store content of 200 pictures with lower temporal resolution and 50 at full temporal resolution. In this example, information about 250 pictures may be stored compared to 100 when all pictures would be stored at full temporal resolution, thus a factor of 2.5 more. In other examples, the first temporal aged data resolution is a factor of 8, 16 or another power of 2 lower than the temporal input data resolution. In again other examples, the first temporal aged data resolution is a factor different from a power of 2 lower than the temporal input data resolution.

In an embodiment, the write controller 120 may be arranged to use at most half of the data storage locations of the plurality of data storage locations for storage of recent data at the temporal input data resolution. In an embodiment, the write controller 120 may be arranged to use half of the data storage locations of the plurality of data storage locations for storage of the recent data at the temporal input data resolution. In an embodiment, for example in a surveillance system, the write controller 120 may be arranged to use a number of data storage locations of the plurality of data storage locations for storage of the recent data at the temporal input data resolution corresponding to a 24 hour period, by having the first pre-determined age criterion correspond to input data having an age equal to or older than 24 hours and having the pre-determined recent age criterion correspond to input data being younger than 24 hours. In an embodiment, for example in a black box system, the write controller 120 may be arranged to use a number of data storage locations of the plurality of data storage locations for storage of the recent data at the temporal input data resolution corresponding to a 24 hour period. The skilled person will appreciate that periods of other lengths may be appropriate for specific applications and/or in specific situations.

In further embodiments, a second pre-determined age criterion is associated at least with a higher age than that associated with the first pre-determined age criterion. Input data satisfying a second pre-determined age criterion may be referred to as older data, indicating that this input data is even older than the old data. With such embodiment, in writing the newly received input data as received via the data input into the data storage memory 20, the write controller 120 may be being further arranged to, if the data storage memory comprises older data: overwrite part of the older data with newly received input data while keeping another part of the older data in the data storage memory at a second temporal aged data resolution. Herein, the older data corresponds to input data previously written into the data storage memory and satisfying a second pre-determined age criterion. The second temporal aged data resolution is lower than the first temporal aged data resolution. The second pre-determined age criterion may be associated with input data having a higher age than input data satisfying the first pre-determined age criterion. Hereby, the total time period for which input data can be kept in the data storage memory may be further increased, with recent data being available in the data storage memory at the temporal input data resolution, old data being available at the first temporal aged data resolution and older data being available at the second temporal aged data resolution. In an example, the first temporal aged data resolution is a factor N smaller than the temporal input data resolution and the second temporal aged data resolution is a factor N smaller than first temporal aged data resolution, thus a factor N*N smaller than the temporal input data resolution. In another example, the first temporal aged data resolution is a factor N smaller than the temporal input data resolution and the second temporal aged data resolution is a factor M, different from N, smaller than first temporal aged data resolution, thus a factor N*M smaller than the temporal input data resolution. In applications where data is less and less relevant the older the data is, even further temporal aged data resolution for even older data may be provided.

In an embodiment, the second temporal age data resolution may be a fixed data resolution, which may, for example, be a predetermined fraction of the temporal input data resolution or of the first temporal age data resolution. The first and/or second temporal age data resolution may alternatively vary over time and/or in dependence on a varying formatting of input data. For example, in some examples of H.264, frames may be formatted as so-called I-frames and so-called P- and B-frames, and some H.264 formats comprise I-frames which may be at a varying temporal distance, with a variation within a certain range. The first and second pre-determined age criterion may in such case also impose a frame-type requirement, such that P- and B-frames can be overwritten when corresponding to old data, whereas I-frames can only be overwritten when corresponding to oldest data. Hereby I-frames are kept at a preference above P- and B-frames, and the first and second temporal age data resolution may vary within a range associated with the variation in temporal distance between I-frame in the input data a provided by the data source.

In writing newly received input data as received via the data input into the data storage memory 20, the write controller 120 may in further embodiments be further arranged to, if the data storage memory comprises oldest data: overwrite the oldest data with newly received input data. The oldest data corresponds to input data previously written into the data storage memory and satisfying a third pre-determined age criterion. The third pre-determined age criterion being associated with input data having a higher age than input data satisfying the first pre-determined age criterion, and, where the write controller also uses the second pre-determined age criterion for old data, the second pre-determined age criterion, Data satisfying the third pre-determined age criterion may also be referred to as "very old data". According to this embodiment, the very old data may thus be effectively removed from the data storage memory so as to free space for writing newly received data into the data storage memory.

As shown in FIG. 2, embodiments of the data logging system 1 may further comprise an event analyser 150. In the example shown in FIG. 2, the event analyser is included in the data storage controller 10 of the data logging system 1. In other embodiments, the data logging system may cooperate with an event analyser that is external to the data logging system. The event analyser 150 may be arranged to analyse the input data to check whether the input data corresponds to an occurrence of one or more events from a group consisting of one or more pre-determined events. The one or more pre-determined events may, for a surveillance system, e.g. be associated with a presence of a non-authorized person in a restricted area, such as a burglar; a presence of a gun, a knife, or another weapon or device suitable as a weapon; a fire; or alike. The one or more pre-determined events may, for a black box system, e.g. be associated with a lane departure, a crash, an accident, a technical failure of some kind in the vehicle, an environmental event such as lightning, a hijack, or any other relevant event. The event analyser 150 may further be arranged to provide an event signal 151 to the data logging system 1 or to the data input 110 or the write controller 120 of the data logging system in case the input data corresponds to such occurrence, to allow the data logging system 1 to react in an appropriate manner to the event signal. The data logging system 1, or specifically the data input 110 or the write controller 120, may be arranged to react on the event signal. FIG. 2 indicates that, in an exemplary embodiment, the event signal 151 may be provided to the write controller 120, to allow data logging system 1 to react on the event signal by an appropriate reaction of the write controller 120. The event signal may alternatively or additionally be provided to e.g. the data input 110 to allow the data input 110 to pause or stop receiving new input data or to react in another appropriate manner. In an embodiment, the data storage controller 10 may have an event terminal 152, whereby the event analyser 150 is connectable to another component or device, such as to the data consumer 3, to provide an external event signal to the another component or device.

A further pre-determined age criterion may be associated with a lower age than that associated with the first pre-determined age criterion. Earlier input data satisfying the further pre-determined age criterion may further be referred to as "most recent data".

The data logging system may, for example, be arranged to, in reacting on the event signal, prevent at least earlier input data present in the data storage memory at the temporal input data resolution satisfying the further pre-determined age criterion, from being overwritten until a release condition is satisfied. The release condition may e.g. be associated with or comprise a future time period, so as to keep the most recent data in the data storage memory at the temporal input data resolution for at least the future time period, allowing to retrieve the most recent data at the, full, temporal input data resolution during the future time period after the occurrence of the event.

The release condition may e.g. require a release action by a user. Hereby, the most recent data associated with the time period just before the event is kept available at the temporal input data resolution until the user has explicitly performed the release action. The user can thus inspect the input data from the time period just before the event, so as to, for example, find the cause of the event, such as find the cause of a motor failure from inspecting the recent black box data at full temporal input data, and perform the release action subsequently.

Preventing the most recent data to be overwritten may comprise stopping the data input 110 from receiving of new input data, such that no new input data is available to be written to the data storage memory 20 and data stored therein is not affected. Preventing the most recent data to be overwritten may comprise pausing the write controller 120 such that no new input data is written to the data storage memory 20 and data stored therein is not affected.

Preventing the most recent data to be overwritten may comprise temporarily inhibiting the writing to the data storage locations in the data storage memory where the most recent data is written, for example by removing these data storage locations from the logical address space.

As indicated in FIG. 2, the event analyser 150 may further be arranged to provide a further event signal 153 to an external device, unit or system, e.g. the data consumer 3. The further event signal may e.g. be used to give a visual and/or audible warning or alarm message to a user, such as to security personnel in a surveillance room.

The data storage memory may have a connector allowing to connect a retrieval system to the data logging system for retrieving data stored in the data logging system from the data storage memory.

As shown in FIG. 2, the storage controller 10 may additionally or alternatively further comprise a read controller 130 arranged to retrieve the recent data from the data storage memory at the temporal input data resolution. The storage controller 10 may comprise a data output 140 arranged to obtain the recent data as retrieved by the read controller from the data storage memory 20 and to provide the recent data to the output terminal 142. Hereby, the recent data, stored in the data storage memory at the temporal input data resolution, including—in associated embodiments—the "most recent data", can be retrieved from the data storage memory, e.g. for inspecting.

In further embodiments of the data logging system, the read controller 130 is further to retrieve the old data from the data storage memory at the first temporal aged data resolution, and the data output 140 is further arranged to obtain the old data as retrieved by the read controller from the data storage memory 20 and to provide the earlier input data at the first temporal aged data resolution to the output terminal. Hereby, the old data, stored in the data storage memory at the first temporal aged data resolution can be retrieved from the data storage memory, e.g. for inspecting, at the reduced temporal resolution.

In other further embodiments of the data logging system, the read controller 130 further comprises an up-convertor 132. Herein, the read controller 130 is further arranged to retrieve the old data from the data storage memory at the first temporal aged data resolution. The up-convertor 132 is arranged to up-convert the old data as retrieved from the first temporal aged data resolution to the temporal input data resolution to obtain a reconstructed input data at a temporal resolution corresponding to the temporal input data resolution. The data output 140 may be further arranged to provide the reconstructed input data at the temporal resolution to the output terminal. Hereby, the old data stored in the data storage memory is made available as reconstructed input data at the same temporal resolution as the temporal input data resolution, e.g. for inspecting. Many up-conversion techniques are known for different types of data. Up-conversion may e.g. comprise data repetition. Up-conversion may e.g. comprise data interpolation to reconstruct data at temporal moments in between the temporal moments associated with the reduced, first temporal aged data resolution with which the old data was stored. Up-conversion may e.g. comprise frame rate conversion for video data. Many different frame rate conversion techniques for video data are known from the art, including as image repetition and motion-compensated up-conversion.

FIG. 3 schematically illustrates input data storage in a data storage memory 20 for logging input data received as a temporal sequence of images at a temporal input data resolution, each image represented by respective image data. The example is highly simplified, and uses a data storage memory 20 having 6 data storage locations, each data storage location being capable to store the image data of one image. The data storage locations are logically enumerated from 1 to 6. In this simplified example, the data logging system is arranged to use half of the storage capacity—so three memory positions—of the data storage memory 20 to store new input data at the temporal input data resolution, and to use the remaining capacity—so three memory positions—to keep earlier input data at a first temporal aged data resolution corresponding to one quarter of the temporal input data resolution. The "old data" is kept as a subsampling factor of 4. This may also be referred to as a temporal decimation with a factor of 4. As the three most recent images are kept at full the temporal input data resolution, the first pre-determined age criterion corresponds to an age of more than 3 frame times, thus 4 frame times or older, in this example.

Overwriting part of the earlier input data while keeping earlier input data satisfying the first pre-determined age criterion in the data storage memory at the first temporal aged data resolution may be achieved in this example by using a simple adder/register circuit, where old image data is kept in the data storage memory at a decimation of $2^n$ with n=2 The operation of the adder/register circuit to provide the data storage location, DTO, may symbolically be given according to a scheme as follows:

while (not event)

{if (i&dd) DTO=(DTO+b1);

else DTO=(DTO+b2);

if (DTO>c) DTO=DTO−c;

arr[DTO]=i;

i++;} (SCHEME1)

where b1, b2 are configuration parameters, c denotes the number of data storage locations (storage capacity number) for storing images, and dd+1 corresponds to the subsampling factor for the old data. i is a counter.

In the example, the parameter values are b1=1, b2=4, c=6, dd=3.

The first column of FIG. 3, denotes the frame number F of the images of a temporal sequence of images received at the temporal input data resolution that us to be stored. The second column shows the data storage location DTO calculated with the formulas above using the frame number F as value for counter i. The 6 columns denote the 6 data storage locations in data storage memory 20; the number indicated in the data storage location fields of FIG. 3 indicate which frame F is written at that location. As long as a data storage location is not yet used, a '0' is indicated in the data storage locations.

FIG. 3 shows that the memory gradually fills up with frames as the frame number increases from top to bottom. In this example, after 3 frames have been written, every next write action corresponds to overwriting an earlier stored frame while decimating the earlier stored frames that are longer in the memory than 3 frame periods, i.e. with satisfying the first age criterion of "being in the memory longer than 3 frame periods".

As an example, after frame 18 is written at time instance T18, the three most recent frames 16, 17, 18 are available in the data storage memory at the full temporal input data resolution (of 1 per frame period), whereas from older frames, only frames 4, 8 and 12 are available in the data storage memory. The frames older than frame 16 are thus available only at a factor 4 reduced temporal resolution (the first temporal aged data resolution corresponds to ¼ per frame period).

After frame 19 is written at the position of old frame 4 at time instance T19, the three most recent frames 17, 18, 19 are available in the data storage memory at the full temporal input data resolution (of 1 per frame period), whereas older frames are kept at the factor of 4 reduced temporal resolution: as shown, only frames 8, 12 and 16 are kept in the data storage memory.

After frame 20 is written at the position of old frame 17 at time instance T20, the three most recent frames 18, 19, 20 are available in the data storage memory at the full temporal input data resolution (of 1 per frame period), whereas older frames are kept at the factor of 4 reduced temporal resolution: as shown, only frames 8, 12 and 16 are kept in the data storage memory.

The writing thus comprises keeping recent data at the temporal input data resolution in the data storage memory if the data storage memory comprises recent data and overwriting part of old data with at least part of the newly received input data while keeping another part of the old data in the data storage memory at a first temporal aged data resolution if the data storage memory comprises old data. The recent data corresponds to input data previously written into the data storage memory and satisfying a pre-determined recent age criterion. The old data corresponds to input data previously written into the data storage memory and satisfying a first pre-determined age criterion. The first temporal aged data resolution is lower than the temporal input data resolution. The first pre-determined age criterion is associated with input data having a higher age than input data satisfying the pre-determined recent age criterion.

The skilled person will appreciate that the scheme (SCHEME1) is only for illustrative purposes and that many other schemes can be designed to achieve keeping the recent data at the temporal input data resolution in the data storage memory, and overwriting part of the old data with newly received input data while keeping old data in the data storage memory at a first temporal aged data resolution that is lower than the temporal input data resolution.

Figure 4:
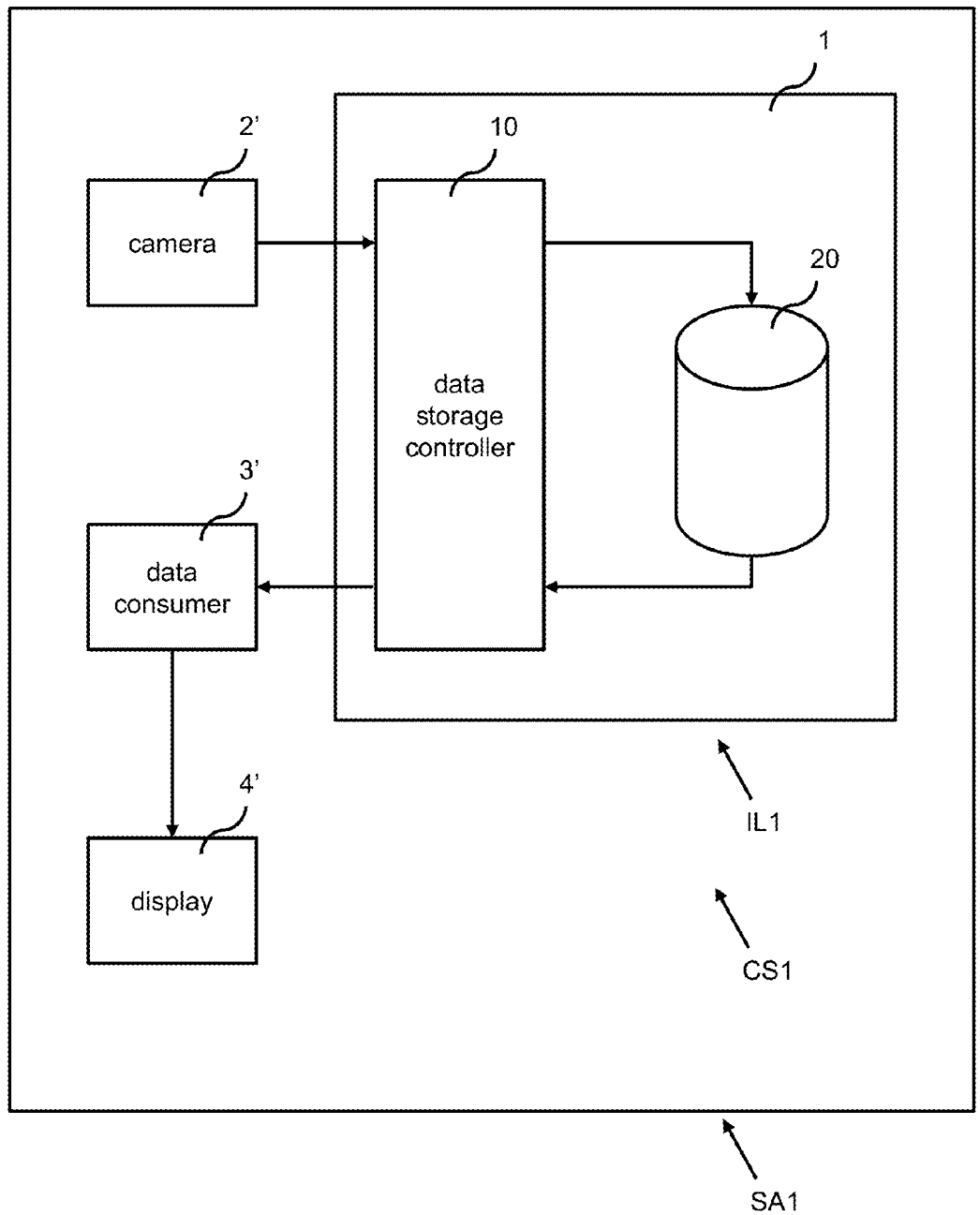
FIG. 4 schematically shows a surveillance area comprising a camera surveillance system.

FIG. 4 schematically shows a surveillance area SA1. The surveillance area SA1 comprises a camera surveillance system CS1. The camera surveillance system CS1 comprises an image logging system IL1, a data consumer 3' in the form of a digital network and a display 4'. The display 4' may be provided in a surveillance room for viewing by security personnel. In the example shown, the digital network connects the image logging system IL1 to a plurality of devices, including the display 4'. The image logging system IL1 comprising a data logging system 1 according to one of the embodiments described above and a camera 2'. The input data comprises at least images captured by the camera. The surveillance area may e.g. be a private home, an office, an office building, a factory, a warehouse, an industrial site, a station, an airport, a museum, any other type of public facility, any other type of building, a fenced area, an open area, or a combination of any of the above.

Figure 5:
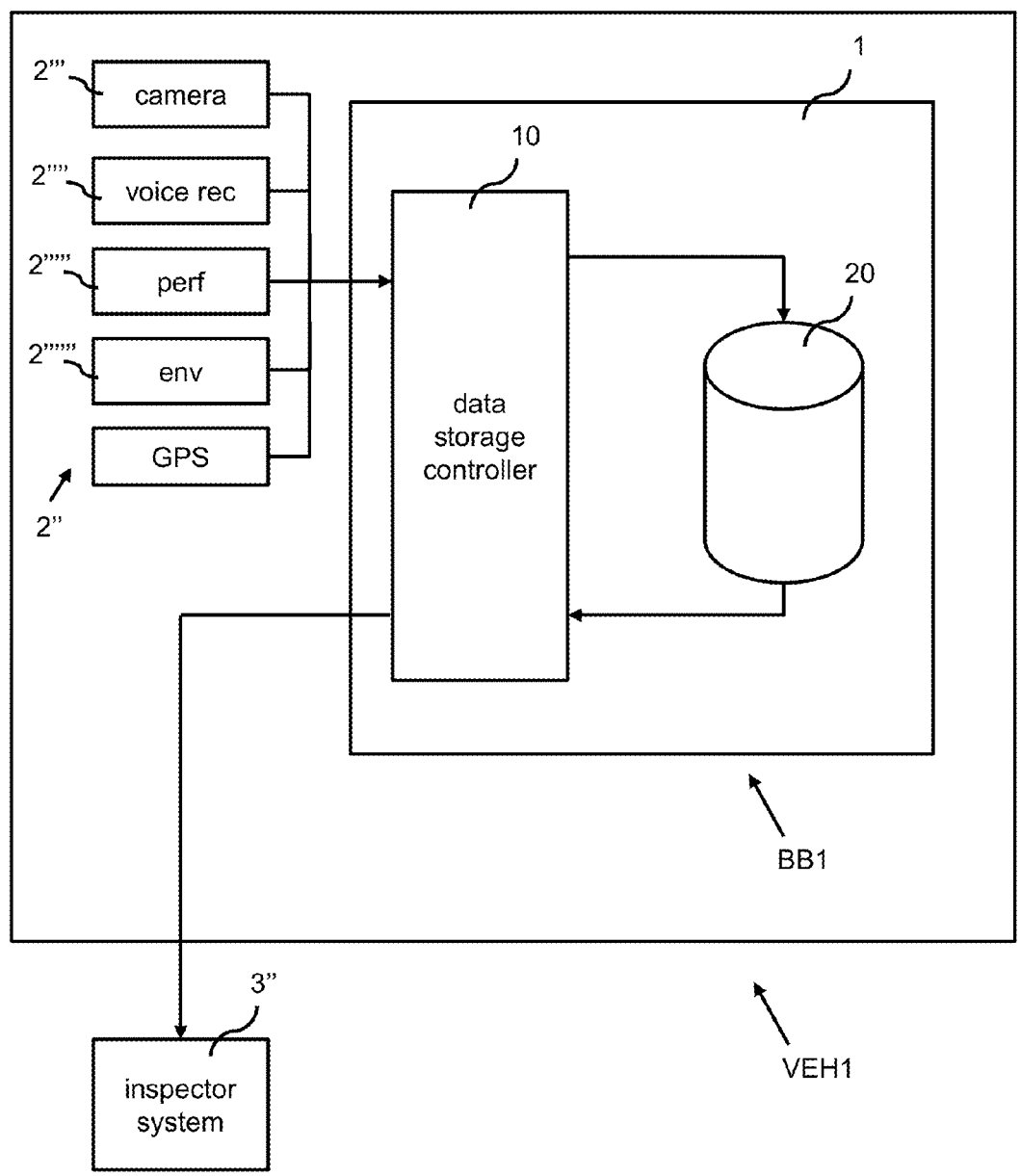
FIG. 5 schematically shows a vehicle comprising a black box system.

FIG. 5 schematically shows a vehicle VEH1 comprising a black box system BB1. The black box system BB1 comprising a data logging system according to one of the embodiments described above and one or more data sources 2". The data sources may be data sources from a group consisting of, for example, an on-board camera 2''', a voice recorder 2'''', a vehicle's performance monitor 2''''', an environmental information monitor, 2'''''' and a geographic position detector GPS. The input data comprises data from the one or more data sources. The black box BB1 may be designed for use in a car, a truck, a bus, a passenger ship, a cargo ship, an airplane, a space craft, or any other vehicle. The data sources may comprise any data source or plurality of data sources usable in a flight recorder, such as used in a flight data recorder and a cockpit voice recorder. The black box system BB1 is arranged to be accessible from a data consumer in the form of an inspector system 3''. The inspector system 3'''' may hereby receive input data previously written into the data storage memory 20 of the black box system BB1. The inspector system 3'''' may e.g. be operable by a traffic control authority, where the black box system BB1 is e.g. used in a train, an airplane or another vehicle in which data is logged with such black box system. In other embodiments, the on-board camera 2''' of the vehicle VEH1 be part of an image logging system IL1 similarly to the an image logging system IL1 described with reference to FIG. 4, allowing, e.g., to record and store images from a vehicle's cabin or a vehicle's passenger compartment.

Figure 6:
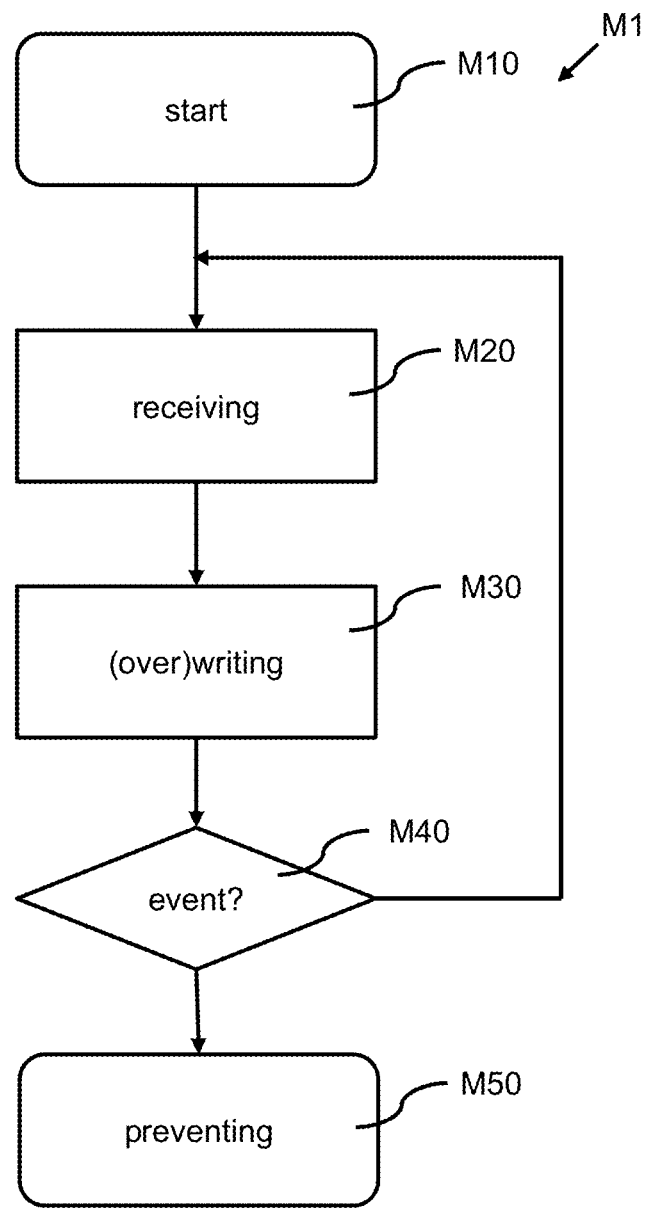
FIG. 6 schematically shows an example of an embodiment of a method of logging input data received from a data source to a data storage memory.

FIG. 6 schematically shows an example of an embodiment of a method M1 of logging input data received from a data source 2 to a data storage memory 20. The data storage memory 20 is arranged to store a plurality of data at a plurality of data storage locations. The method is started or re-started in initial block M10, e.g. by a start command, a reset or a release action by a user, or automatically in response of e.g. a power-up, a start signal or a wakeup signal provided by another device.

The method comprises repeatedly receiving M20 input data having a temporal input data resolution from the data source.

The method further comprises writing M30 newly received input data into the data storage memory. The writing comprises writing the newly received input data at the temporal input data resolution. The writing comprises, if the data storage memory comprises recent data, keeping the recent data at the temporal input data resolution in the data storage memory. The writing comprises, if the data storage memory comprises old data, overwriting part of the old data with at least part of the newly received input data while keeping another part of the old data in the data storage memory at a first temporal aged data resolution. Herein, the recent data corresponds to input data previously written into the data storage memory and satisfying a pre-determined recent age criterion, the old data corresponds to input data previously written into the data storage memory and satisfying a first pre-determined age criterion, the first temporal aged data resolution is lower than the temporal input data resolution, and the first pre-determined age criterion is associated with input data having a higher age than input data satisfying the pre-determined recent age criterion.

The writing M30 into the data storage memory 20 may use a file system for writing the newly received input data to the data storage memory.

The first temporal aged data resolution may be at least a factor of 2 lower than the temporal input data resolution, such as a factor of 2, 4, 8, or any power of 2. In other examples, the first temporal aged data resolution is a factor different from a power of 2 lower than the temporal input data resolution.

The writing M30 may use at most half of the data storage locations of the plurality of data storage locations for storage of the recent data at the temporal input data resolution.

The method may further comprise, if the data storage memory comprises older data: over-writing part of the older data with newly received input data while keeping another part of the older data in the data storage memory at a second temporal aged data resolution. Herein, the older data corresponds to input data previously written into the data storage memory and satisfying a second pre-determined age criterion, the second temporal aged data resolution is lower than the first temporal aged data resolution, and the second pre-determined age criterion is associated with input data having a higher age than input data satisfying the first pre-determined age criterion.

The second temporal aged data resolution may be at least a factor of 2 lower than the first temporal aged data resolution, such as a factor of 2, 4, 8, or any power of 2. In other examples, the second temporal aged data resolution is a factor different from a power of 2 lower than the first temporal aged data resolution In an embodiment, the first temporal aged data resolution is a factor of A lower than the temporal input data resolution, A being least 2, and the second temporal aged data resolution is a factor of A lower than the first temporal aged data resolution, whereby the second temporal aged data resolution is a factor of $A*A$ lower than the temporal input data resolution. For example, the first temporal aged data resolution is a factor of 4 lower than the temporal input data resolution and the second temporal aged data resolution is a factor of 16 lower than the temporal input data resolution, An another example, the first temporal aged data resolution is a factor of 8 lower than the temporal input data resolution and the second temporal aged data resolution is a factor of 64 lower than the temporal input data resolution, In another embodiment, the first temporal aged data resolution is a factor of A lower than the temporal input data resolution, A being at least 2, and the second temporal aged data resolution is a factor of $B=2*A$ lower than the first temporal aged data resolution, whereby the second temporal aged data resolution is a factor of $2*A*A$ lower than the temporal input data resolution. For example, the first temporal aged data resolution is a factor of 4 lower than the temporal input data resolution and the second temporal aged data resolution is a factor of 32 lower than the temporal input data resolution.

The method may further comprise, if the data storage memory comprises oldest data, overwriting the oldest data with newly received input data. Herein, the oldest data may correspond to input data previously written into the data storage memory and satisfying a third pre-determined age criterion, and the third pre-determined age criterion may be associated with input data having a higher age than input data satisfying the first pre-determined age criterion, and, in embodiments also using the second pre-determined age criterion, the second pre-determined age criterion.

As an example for a surveillance system, the pre-determined recent age criterion may e.g. correspond to input data younger than 24 hours and recent data may be kept at the temporal input data resolution, the first pre-determined age criterion may correspond to data being at least 24 hours old, the second pre-determined age criterion may correspond to data being at least 48 hours, and the third pre-determined age criterion may correspond to at least 1 week. Herein, as an example, the first temporal aged data resolution may be a factor of 4 lower than the temporal input data resolution and the second temporal aged data resolution may be a factor of 16 lower than the temporal input data resolution, so that recent data may be kept at temporal input data resolution, old data of 24 to 48 hours old may be kept at 4 times lower data resolution, older data of 48 hours to 1 week old may be kept at 16 times lower data resolution, and oldest data with an age of 1 week or more may be overwritten.

The skilled person will appreciate that, in embodiments where no second pre-determined age criterion is used, the method may comprise, where the data storage memory comprises oldest data, oldest data corresponding to input data satisfying a third pre-determined age criterion, the third pre-determined age criterion being associated with input data having a higher age than associated with the first pre-determined age criterion, overwriting the oldest data with newly received input data. Hereby, recent data may be kept at temporal input data resolution, old data may be kept at a first temporal aged data resolution, and data with a higher age, may be overwritten.

The method may further comprise analysing M40 the input data to check whether the input data corresponds to an occurrence of one or more events from a group consisting of one or more pre-determined events, and, in case the input data corresponds to such occurrence, reacting to such event. The reacting may be done in any manner as described above.

Reacting on the event signal may comprise preventing M50 at least most recent data present in the data storage memory at the temporal input data resolution satisfying a further pre-determined age criterion, from being overwritten until a release condition is satisfied, the further pre-determined age criterion being associated at least with a lower age than that associated with the first pre-determined age criterion.

Figure 7:
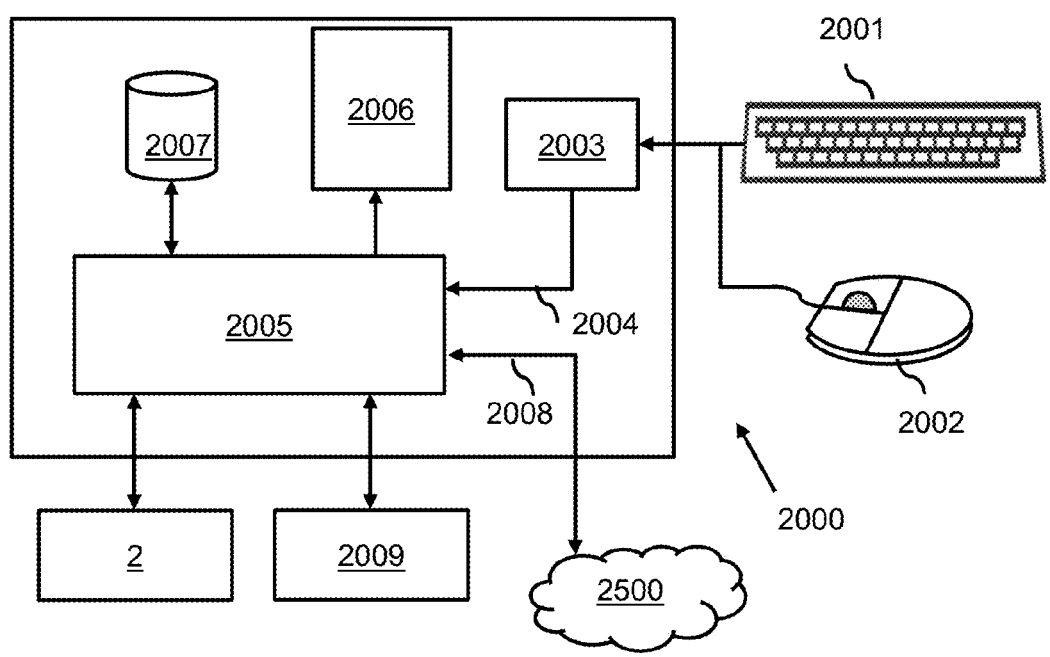
FIG. 7 schematically shows an exemplary user interaction system for interacting with a data logging system.

FIG. 7 schematically shows an exemplary user interaction system 2000 having a programmable processor 2005. The user interaction system 2000 is shown to be a personal computer, but may be any type of suitable user interaction system 2000. The user interaction system 2000 is connected to a data source 2, which may include a camera, capable of providing input data to the user interaction system 2000. The user interaction system 2000 further comprises a storage unit 2007, a user input 2003 and a display 2006, which may be the same as display 4' in FIG. 4 or an alternative or additional display. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to present visual information on the display 2006 and to communicate with a data I/O device 2009, such as an optical disc drive or a solid state reader/writer. The storage unit 2007 comprises a data storage memory 20. The data storage memory 20 is arranged to store a plurality of data at a plurality of data storage locations. The processor 2005 is arranged to perform any one of the methods according to the invention to implement a data storage controller 10 according to an embodiment. The processor 2005 and the storage unit 2007 hereby cooperate to implement a data logging system 1 according to the embodiment. The processor 2005 is arranged to cooperate with the storage unit 2007, allowing storing and retrieving information on the storage unit 2007, such as the input data received from the data source. The user interaction system 2000 may further comprise a communication channel 2008 allowing the processor 2005 to connect to an external cloud 2500 for communicating with other devices in the cloud. The external cloud may e.g. be the Internet. The user interaction system 2000 may allow a user to inspect the data stored in a data storage memory 20. The processor 2005 may also be arranged to retrieve earlier image data, old image data, older image data and/or most recent image from the storage unit 2007, or from another device in the cloud 2500, and generate a report by the processor 2005. The processor 2005 may be capable to read, using the data I/O device 2009, a computer readable medium comprising a program code. The processor 2005 may be capable to read, using the data I/O device 2009, a computer readable medium comprising a computer program product comprising instructions for causing the user interaction system 2000 to perform a method of logging input data received from the data source 2 to the data storage memory 20, the method comprising repeatedly receiving M20 input data having a temporal input data resolution from the data source and writing M30 newly received input data into the data storage memory. The writing comprises writing the newly received input data at the temporal input data resolution. The writing comprises, if the data storage memory comprises recent data, keeping the recent data at the temporal input data resolution in the data storage memory. The writing comprises, if the data storage memory comprises old data, overwriting part of the old data with at least part of the newly received input data while keeping another part of the old data in the data storage memory at a first temporal aged data resolution. Herein, the recent data corresponds to input data previously written into the data storage memory and satisfying a pre-determined recent age criterion, the old data corresponds to input data previously written into the data storage memory and satisfying a first pre-determined age criterion, the first temporal aged data resolution is lower than the temporal input data resolution, and the first pre-determined age criterion is associated with input data having a higher age than input data satisfying the pre-determined recent age criterion. The method may further comprise further features from embodiments described above.

Figure 8:
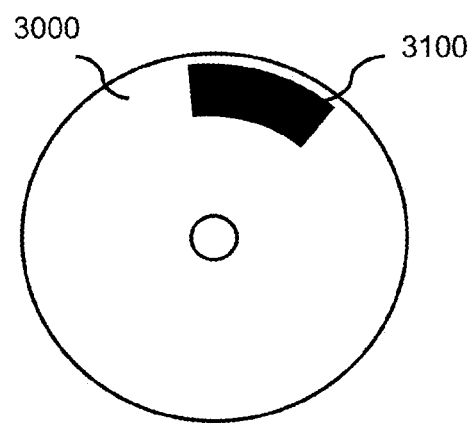
FIG. 8 shows a computer readable medium comprising a computer program product.

FIG. 8 shows a computer readable medium 3000 comprising a computer program product 3100, the computer program product 3100 comprising instructions for causing a processor apparatus to perform a method of logging input data received from the data source 2 to the data storage memory 20, the method comprising repeatedly receiving M20 input data having a temporal input data resolution from the data source and writing M30 newly received input data into the data storage memory. The writing comprises writing the newly received input data at the temporal input data resolution. The writing comprises, if the data storage memory comprises recent data, keeping the recent data at the temporal input data resolution in the data storage memory.

The writing comprises, if the data storage memory comprises old data, overwriting part of the old data with at least part of the newly received input data while keeping another part of the old data in the data storage memory at a first temporal aged data resolution. Herein, the recent data corresponds to input data previously written into the data storage memory and satisfying a pre-determined recent age criterion, the old data corresponds to input data previously written into the data storage memory and satisfying a first pre-determined age criterion, the first temporal aged data resolution is lower than the temporal input data resolution, and the first pre-determined age criterion is associated with input data having a higher age than input data satisfying the pre-determined recent age criterion. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 8 as an optical disc, the computer readable medium 3000 may be any suitable computer readable medium, such as a hard disk, solid state memory, flash memory, etc., and may be non-recordable or recordable. The computer readable medium may be a non-transitory tangible computer readable storage medium or a transitory computer readable storage medium such as a computer readable signal. The computer readable storage medium comprises data loadable in a programmable apparatus, the data representing instructions executable by the programmable apparatus, said instructions comprising logging instructions for logging input data received from a data source to a data storage memory arranged to store a plurality of data at a plurality of data storage locations. The logging instructions comprise one or more receive instructions for receiving input data having a temporal input data resolution from the data source. The logging instructions comprise one or more write instructions for writing newly received input data into the data storage memory. The writing comprises, if the data storage memory comprises recent data, keeping the recent data at the temporal input data resolution in the data storage memory. The writing comprises, if the data storage memory comprises old data, overwriting part of the old data with at least part of the newly received input data while keeping another part of the old data in the data storage memory at a first temporal aged data resolution. Herein, the recent data corresponds to input data previously written into the data storage memory and satisfying a pre-determined recent age criterion, the old data corresponds to input data previously written into the data storage memory and satisfying a first pre-determined age criterion, the first temporal aged data resolution is lower than the temporal input data resolution, and the first pre-determined age criterion is associated with input data having a higher age than input data satisfying the pre-determined recent age criterion.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

Furthermore, although FIGS. 1 and 2 and the discussion thereof describe an exemplary system, this exemplary system is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of interaction system 2000, for example, from computer readable media such as memory 2007 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few. The computer readable medium may be a non-transitory tangible computer readable storage medium or a transitory computer readable storage medium.

In one embodiment, interaction system 2000 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data logging system for logging input data received from a data source, the data logging system comprising:
   a data storage memory arranged to store a plurality of data at a plurality of data storage locations; and
   a data storage controller comprising:
      a data input arranged to repeatedly receive input data having a temporal input data resolution from the data source, and
      a write controller arranged to write newly received input data as received via the data input into the data storage memory, the write controller being arranged to, in writing the newly received input data as received via the data input into the data storage memory:
         write the newly received input data at the temporal input data resolution,
         if the data storage memory comprises recent data: keep the recent data at the temporal input data resolution in the data storage memory, and
         if the data storage memory comprises old data: overwrite part of the old data with at least part of the newly received input data while keeping another part of the old data in the data storage memory at a first temporal aged data resolution,
      the recent data corresponding to input data previously written into the data storage memory and satisfying a pre-determined recent age criterion,
      the old data corresponding to input data previously written into the data storage memory and satisfying a first pre-determined age criterion,
      the first temporal aged data resolution being lower than the temporal input data resolution, and
      the first pre-determined age criterion being associated with input data having a higher age than input data satisfying the pre-determined recent age criterion.

2. A data logging system according to claim 1, the write controller comprising:
   a location allocator arranged to:
      determine which data storage locations comprise the old data, and determine which of the data storage locations comprising the old data are available to be overwritten with newly received input data.

3. A data logging system according to claim 1, the write controller being arranged to write into the data storage memory using a file system for writing the newly received input data to the data storage memory.

4. A data logging system according to claim 1, the first temporal aged data resolution being at least a factor of 2 lower than the temporal input data resolution.

5. A data logging system according to claim 1, the write controller being arranged to use at most half of the data storage locations of the plurality of data storage locations for storage of the recent data at the temporal input data resolution.

6. A data logging system according to claim 1, the write controller being further arranged to, in writing the newly received input data as received via the data input into the data storage memory:
   if the data storage memory comprises older data:
      overwrite part of the older data with newly received input data while keeping another part of the older data in the data storage memory at a second temporal aged data resolution,
   the older data corresponding to input data previously written into the data storage memory and satisfying a second pre-determined age criterion,
   the second temporal aged data resolution being lower than the first temporal aged data resolution, and
   the second pre-determined age criterion being associated with input data having a higher age than input data satisfying the first pre-determined age criterion.

7. A data logging system according to claim 1, the write controller being further arranged to, in writing newly received input data as received via the data input into the data storage memory:
   if the data storage memory comprises oldest data:
      overwrite the oldest data with newly received input data,
   the oldest data corresponding to input data previously written into the data storage memory and satisfying a third pre-determined age criterion, and
   the third pre-determined age criterion being associated with input data having a higher age than input data satisfying the first pre-determined age criterion, and, as far as dependent on claim 6, the second pre-determined age criterion.

8. A data logging system according to claim 1, the data logging system comprising or being arranged to cooperate with:
   an event analyser arranged to:
      analyse the input data to check whether the input data corresponds to an occurrence of one or more events from a group consisting of one or more pre-determined events; and
      provide an event signal to the data logging system in case the input data corresponds to such occurrence; and
   the data logging system being arranged to react on the event signal.

9. A data logging system according to claim 8, the data logging system being arranged to, in reacting on the event signal, prevent at least input data present in the data storage memory at the temporal input data resolution satisfying a further pre-determined age criterion, from being overwritten until a release condition is satisfied, the further pre-determined age criterion being associated at least with a lower age than that associated with the first pre-determined age criterion.

10. A data logging system according to claim 1 the storage controller further comprising:
   a read controller arranged to retrieve the recent data from the data storage memory at the temporal input data resolution, and
   a data output arranged to obtain the recent data as retrieved by the read controller from the read controller and to provide the recent data to an output terminal connectable to a data consumer.

11. A data logging system according to claim 10,
   the read controller further arranged to retrieve the old data from the data storage memory at the first temporal aged data resolution, and
   the data output further arranged to obtain the old data as retrieved by the read controller from the read controller and to provide the old data at the first temporal aged data resolution to the output terminal.

12. A data logging system according to claim 10,
   the read controller further arranged to retrieve the old data from the data storage memory at the first temporal aged data resolution,
   the read controller further comprising an up-convertor arranged to up-convert the old data as retrieved from the first temporal aged data resolution to the temporal input data resolution to obtain a reconstructed input data at a temporal resolution corresponding to the temporal input data resolution, and
   the data output further arranged to provide the reconstructed input data at the temporal resolution to the output terminal.

13. An image logging system, the image logging system comprising a data logging system according to claim 1 and a camera, the input data comprising at least images captured by the camera.

14. A black box system, the black box system comprising a data logging system according to claim 1 and one or more data sources of a group consisting of a on-board camera, a voice recorder, a vehicle's performance monitor, an environmental information monitor and a geographic position detector, the input data comprising data from the one or more data sources.

15. A camera surveillance system comprising an image logging system according to claim 13.

16. A surveillance area comprising a camera surveillance system according to claim 15.

17. A vehicle comprising an image logging system according to claim 13.

18. A method of logging input data received from a data source to a data storage memory arranged to store a plurality of data at a plurality of data storage locations, the method comprising:
   repeatedly receiving input data having a temporal input data resolution from the data source and
   writing newly received input data into the data storage memory, the writing comprising:
      writing the newly received input data at the temporal input data resolution,
      if the data storage memory comprises recent data: keeping the recent data at the temporal input data resolution in the data storage memory, and
      if the data storage memory comprises old data: overwriting part of the old data with at least part of the newly received input data while keeping another part of the old data in the data storage memory at a first temporal aged data resolution, the recent data corresponding to input data previously written into the data storage memory and satisfying a pre-determined recent age criterion, the old data corresponding to input data previously written into the data storage memory and satisfying a first pre-determined age criterion the first temporal aged data resolution being lower than the temporal input data resolution, and the first pre-determined age criterion being associated with input data having a higher age than input data satisfying the pre-determined recent age criterion.

19. A computer program product comprising instructions stored at a non-transitory medium for causing a programmable apparatus to perform a method of logging input data received from a data source to a data storage memory arranged to store a plurality of data at a plurality of data storage locations as claimed in claim 18.

20. A non-transitory tangible computer readable storage medium comprising data loadable in a programmable apparatus, the data representing instructions executable by the programmable apparatus, said instructions comprising logging instructions for logging input data received from a data source to a data storage memory arranged to store a plurality of data at a plurality of data storage locations, the logging instructions comprising:

one or more receive instructions for receiving input data having a temporal input data resolution from the data source; and one or more write instructions for writing newly received input data into the data storage memory, the writing comprising:

writing the newly received input data at the temporal input data resolution, if the data storage memory comprises recent data: keeping the recent data at the temporal input data resolution in the data storage memory, and if the data storage memory comprises old data: overwriting part of the old data with at least part of the newly received input data while keeping another part of the old data in the data storage memory at a first temporal aged data resolution, the recent data corresponding to input data previously written into the data storage memory and satisfying a pre-determined recent age criterion, the old data corresponding to input data previously written into the data storage memory and satisfying a first pre-determined age criterion, the first temporal aged data resolution being lower than the temporal input data resolution, and the first pre-determined age criterion being associated with input data having a higher age than input data satisfying the pre-determined recent age criterion.

* * * * *